United States Patent
Chang et al.

(10) Patent No.: US 8,784,981 B2
(45) Date of Patent: Jul. 22, 2014

(54) STAINLESS STEEL-AND-RESIN COMPOSITE AND METHOD FOR MAKING SAME

(75) Inventors: Hsin-Pei Chang, New Taipei (TW);
Wen-Rong Chen, New Taipei (TW);
Huann-Wu Chiang, New Taipei (TW);
Cheng-Shi Chen, New Taipei (TW);
Dai-Yu Sun, Shenzhen (CN);
Yuan-Yuan Feng, Shenzhen (CN);
Yu-Qiang Wang, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 235 days.

(21) Appl. No.: 13/282,235

(22) Filed: Oct. 26, 2011

(65) Prior Publication Data
US 2012/0237755 A1    Sep. 20, 2012

(30) Foreign Application Priority Data
Mar. 14, 2011    (CN) .......................... 2011 1 0060357

(51) Int. Cl.
*B32B 3/06* (2006.01)
*B05D 3/10* (2006.01)

(52) U.S. Cl.
USPC ................. 428/306.6; 428/472.1; 428/701; 428/702

(58) Field of Classification Search
None
See application file for complete search history.

(56) References Cited

U.S. PATENT DOCUMENTS

| | | | |
|---|---|---|---|
| 4,528,070 A * | 7/1985 | Gamblin | 101/128.4 |
| 6,946,597 B2 * | 9/2005 | Sager et al. | 136/263 |
| 2006/0055084 A1 | 3/2006 | Yamaguchi et al. | |
| 2006/0141315 A1 * | 6/2006 | Murata et al. | 429/33 |
| 2008/0164807 A1 * | 7/2008 | Hofmann et al. | 313/504 |
| 2009/0035589 A1 * | 2/2009 | Lee | 428/457 |
| 2011/0318585 A1 * | 12/2011 | Su et al. | 428/419 |

FOREIGN PATENT DOCUMENTS

| | | | |
|---|---|---|---|
| CN | 101341023 A | | 1/2009 |
| CN | 101941271 A | | 1/2011 |
| GB | 2462433 A | * | 2/2010 |
| JP | 11271963 | * | 8/1999 |
| TW | 200906610 A | | 2/2009 |
| TW | 200936810 A | | 9/2009 |
| WO | WO20099066658 | * | 5/2009 |
| WO | 2010016485 A1 | | 2/2010 |

* cited by examiner

*Primary Examiner* — Vera Katz
(74) *Attorney, Agent, or Firm* — Novak Druce Connolly Bove + Quigg LLP

(57) ABSTRACT

A stainless steel-and-resin composite includes a stainless steel part and a resin part bonded to the stainless steel part. The stainless steel part has a porous film resulted from anodizing formed thereon. The porous film defines pores with an average diameter of about 100 nm-500 nm. The resin part is integrally bonded to the surface of the stainless steel part having the porous film, with portions of the resin part penetrating in the pores. The resin part mainly comprises crystalline thermoplastic synthetic resin.

4 Claims, 4 Drawing Sheets

STAINLESS STEEL-AND-RESIN COMPOSITE AND METHOD FOR MAKING SAME

BACKGROUND

1. Technical Field

The present disclosure relates to stainless steel-and-resin composites, particularly to a stainless steel-and-resin composite having high bonding strength between the stainless steel and the resin and a method for making the composite.

2. Description of Related Art

A typical method for joining stainless steel parts and resin includes chemically etching the surfaces of the stainless steel parts to obtain a suitable surface roughness. Then, the resin is injected to bond with the chemically etched surfaces of the stainless steel parts by insert molding. However, the temperature of a reaction system used during the chemically etching process can be higher than about 80° C., making it difficult to control. Furthermore, the surfaces of the stainless steel parts can easily turn black under such a high temperature.

Therefore, there is room for improvement within the art.

BRIEF DESCRIPTION OF THE FIGURES

Many aspects of the stainless steel-and-resin composite can be better understood with reference to the following figures. The components in the figures are not necessarily drawn to scale, the emphasis instead being placed upon clearly illustrating the principles of the stainless steel-and-resin composite. Moreover, in the drawings like reference numerals designate corresponding parts throughout the several views.

DETAILED DESCRIPTION

Figure 1:
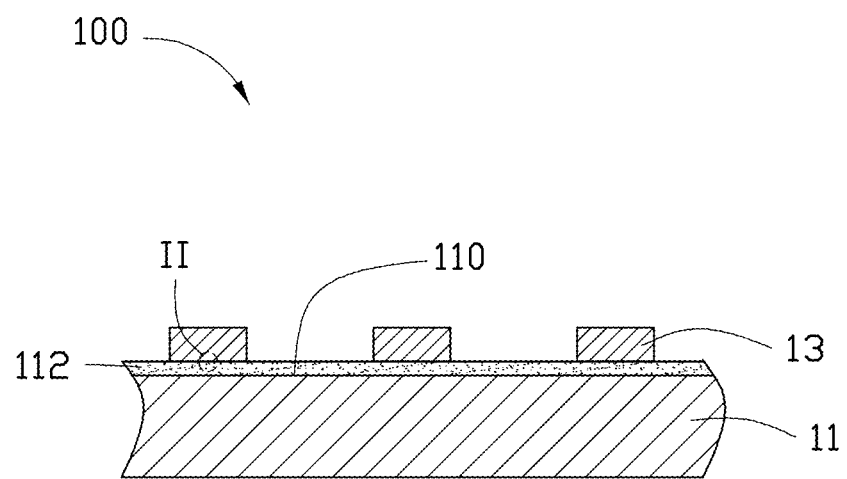
FIG. 1 is a cross-sectional schematic view of an exemplary embodiment of the present stainless steel-and-resin composite.

FIG. 1 shows a stainless steel-and-resin composite 100 according to an exemplary embodiment. The stainless steel-and-resin composite 100 includes a stainless steel part 11 and resin parts 13 integrally formed on the stainless steel part 11.

In the exemplary embodiment, the stainless steel part 11 is made of stainless steel, which in the present disclosure refers to known corrosion-resistant ferrous alloys and which include, for instance, Cr stainless steel resulting from adding chromium (Cr) to iron, and Cr—Ni stainless steel comprising combination of nickel (Ni) and chromium (Cr). Cr stainless steels include, for instance, SUS405, SUS429 or SUS403, while Cr—Ni stainless steels include, for instance, SUS301, SUS304, SUS305 or SUS316, according to the International Organization for Standardization (ISO), Japanese Industrial Standards (JIS) or the American Society for Testing and Materials (ASTM).

Figure 2:
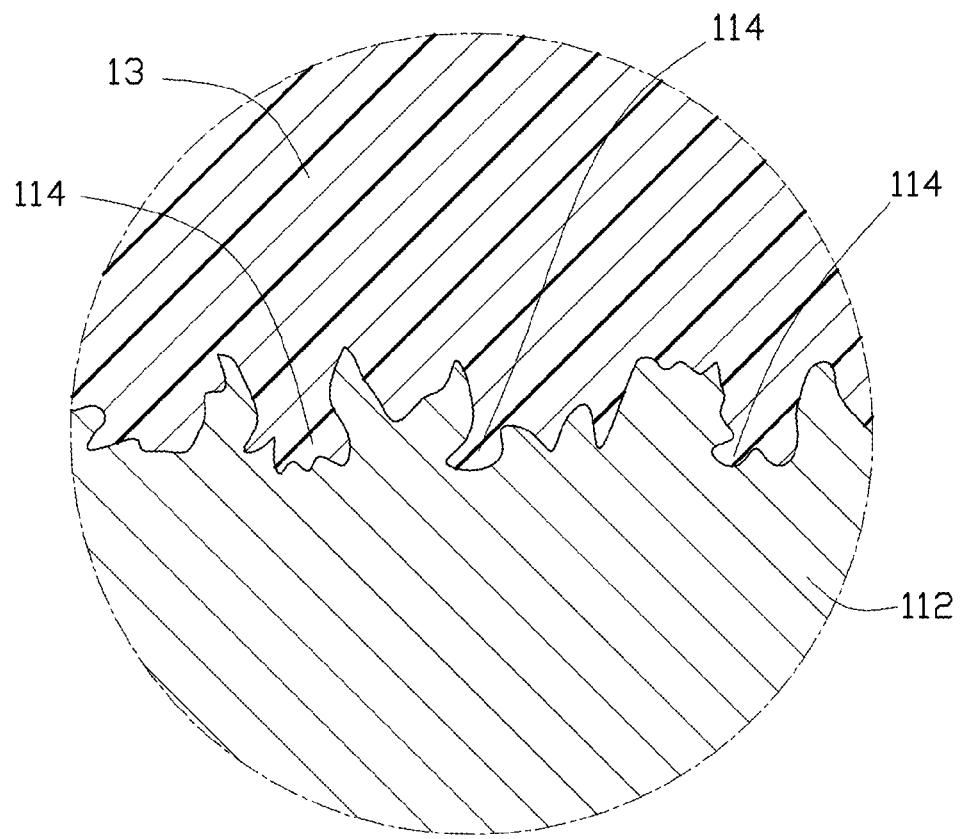
FIG. 2 is an enlarged schematic view of a circled portion II of FIG. 1.

Referring to FIG. 2, the stainless steel part 11 has a porous film 112 formed on a surface 110 thereof. The porous film 112 has an arithmetical mean surface roughness (Ra) of about 0.2 micrometer (μm) to about 1.0 μm, a ten-point mean roughness (Rz) of about 2.5 μm to about 5.0 μm, and a mean width of profile elements (Rsm) of about 30 μm to about 50 μm. The porous film 112 defines a plurality of pores 114. The pores 114 may be irregularly-shaped. The pores 114 may have an average diameter of about 100 nanometers (nm) to about 500 nm.

The porous film 112 substantially comprises elements Fe, Cr, Ni, O in large quantities, and elements Cl and N in smaller quantities. The elements in the porous film 112 exit mainly as compounds iron oxide, nickel oxide, chromium chloride, and nickel chloride. The porous film 112 may have a thickness of about 0.7 μm to about 1.5 μm. The porous film 112 may be an anodic oxide film resulted from an anodizing process applied to the stainless steel part 11.

The resin parts 13 may be bonded to the stainless steel part 11 by injection molding, with portions of the resin parts penetrating in the pores 114 (see FIG. 2). The resin parts 13 mainly comprise crystalline thermoplastic synthetic resin having high fluidity, such as polyphenylene sulfide (PPS), polyamide (PA), or polyethylene terephthalate (PET). It is to be understood that auxiliary components may be added to the resins to modify properties of the resin parts 13. For example, when PPS is used for the resin parts 13, glass fiber may be added as an auxiliary ingredient at a weight percentage of about 25%-35%. These resin parts 13 can bond firmly with the stainless steel part 11.

A method for making the composite 100 may include the following steps:

The stainless steel part 11 is provided. The stainless steel part 11 may be formed by punching and have a desired shape.

The stainless steel part 11 is degreased. The degreasing process may include the step of dipping the stainless steel part 11 in a degreasing agent for about 5 minutes (min) to about 15 min. The degreasing agent may be a commercial degreaser special for stainless steel or a neutral detergent in common use. The stainless steel part 11 is then rinsed in water.

The stainless steel part 11 is activated to remove the natural iron oxide formed on the surface of the stainless steel part 11. The activating process includes dipping the stainless steel part 11 in an acidic solution at a room temperature for about 1 min-2 min. The acidic solution may be a sulphuric acid solution or hydrochloric acid solution. When a sulphuric acid solution is used, the sulphuric acid may have a mass percentage of about 15%-35% within the acidic solution. In this exemplary embodiment, the stainless steel part 11 is dipped in a sulphuric acid solution having a mass percentage of about 15% for about 1 min During the activating process, a layer of natural oxide of iron formed on the surface of the stainless steel part 11 is removed, without etching the stainless steel part 11 under the layer of natural oxide of iron. That is, no obvious pores or recesses are formed on the stainless steel part 11 during the activating process. When the activating process is finished, stainless steel part 11 is rinsed with water.

The stainless steel part 11 is anodized to form the porous film 112. The anodizing process may be carried out in an electrolyte containing nitric acid, ferric chloride, and an additive, with the stainless steel part 11 being an anode, and a titanium board being a cathode. The nitric acid may have a mass percentage of about 1%-10% within the electrolyte. The ferric chloride may have a mass concentration of about 10 g/L-100 g/L. The additive may be thiocarbamide at a mass concentration of about 1 g/L-10 g/L or sodium potassium tartrate at a mass concentration of about 4 g/L-40 g/L. An electric current density about 1 ampere per square decimeter ($A/dm^2$)-10 $A/dm^2$ is applied between the anode and the cathode. The electrolyte maintains a temperature of about 15° C.-60° C. during the anodizing. Anodizing the stainless steel part 11 may take about 1 min-3 min Then, the stainless steel part 11 is rinsed in water and then dried.

Figure 3:
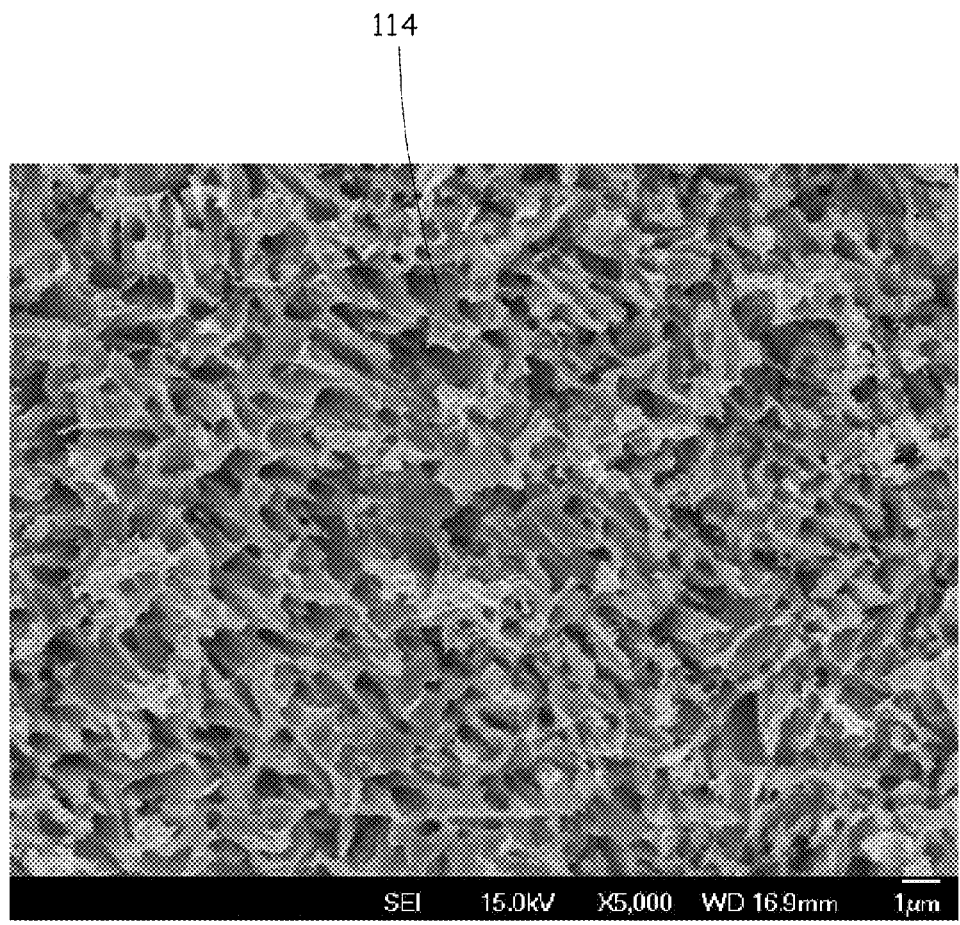
FIG. 3 is a scanning electron microscopy view of an exemplary embodiment of the anodized stainless steel part.

Referring to FIG. 3, the anodized stainless steel part 11 is observed using a field emission scanning electronic microscope, such as a JSM-6700F type microscope sold by JEOL Ltd. The observation shows that the porous film 112 is formed on the stainless steel part 11. The porous film 112 defines a plurality of irregular pores 114. The pores 114 have an average diameter of about 100 nm-500 nm.

Figure 4:
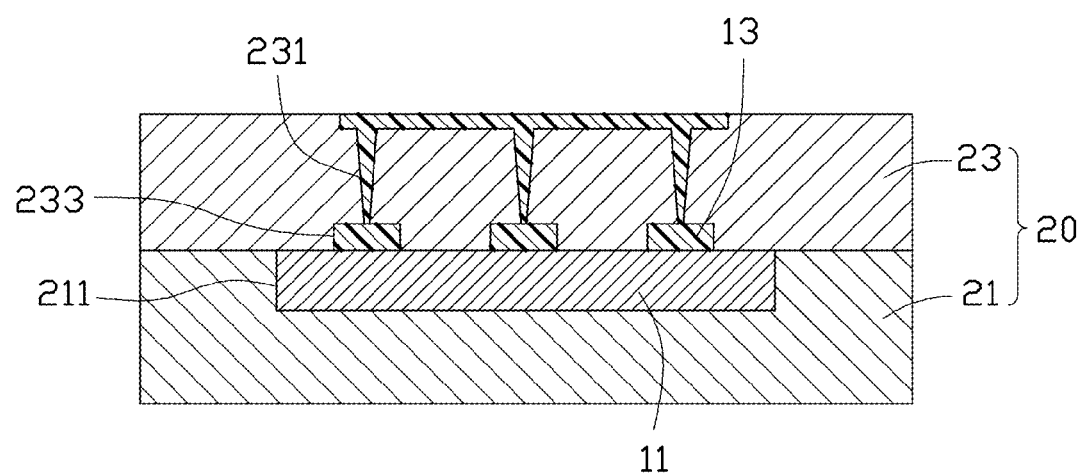
FIG. 4 is a cross-sectional view of molding the composite shown in FIG. 1.

Referring to FIG. 4, an injection mold 20 is provided. The injection mold 20 includes a core insert 23 and a cavity insert 21. The core insert 23 defines several gates 231, and several first cavities 233. The cavity insert 21 defines a second cavity 211 for receiving the stainless steel part 11. The anodized stainless steel part 11 is located in the second cavity 211, and molten resin is injected through the gates 231 to coat the surface of the stainless steel part 11 and fill the pores 114, and finally fill the first cavities 233 to form the resin parts 13, as such, the composite 100 is formed. The molten resin may be crystalline thermoplastic synthetic resins having high fluidity, such as PPS, PA, or PET. When PPS is used, glass fiber may be added as an auxiliary ingredient at a weight percentage of about 25%-35%. During the molding process, the injection mold 20 may be at a temperature of about 120° C.-140° C.

Furthermore, tensile strength and shear strength of the composite 100 have been tested. A universal material testing machine sold by INSTRON Ltd may be used. The tests indicate that the tensile strength of the composite 100 is greater than 15 MPa, and the shear strength of the composite 100 is about 20 MPa-30 MPa. Furthermore, the composite 100 has been subjected to a temperature humidity bias test (72 hours, 85° C., relative humidity: 85%) and a thermal shock test (48 hours, −40° C. to 85° C., 4 hours/cycle, 12 cycles total), such testing did not result in decreased tensile strength and shear strength of the composite 100.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A stainless steel-and-resin composite, comprising:
   a stainless steel part having a porous film formed on and in direct contact with a surface thereof, wherein the porous film is an anodic oxide film resulting from anodizing the stainless steel part, the porous film having pores with an average diameter of about 100 nm-500 nm, the porous film substantially comprising elements Fe, Cr, Ni, O, Cl and N, the elements Fe, Cr, Ni, O, Cl and N exiting mainly as compounds comprising iron oxide, nickel oxide, chromium chloride, and nickel chloride; and
   a resin part integrally bonded to the surface of the stainless steel part having the porous film, with portions of the resin part penetrating in the pores, the resin part mainly comprising crystalline thermoplastic synthetic resin.

2. The composite as claimed in claim 1, wherein the porous film has an arithmetical mean surface roughness Ra of about 0.2 μm to about 1.0 μm, a ten-point mean roughness Rz of about 2.5 μm to about 5.0 μm, and a mean width of profile elements Rsm of about 30 μm to about 50 μm.

3. The composite as claimed in claim 1, wherein the crystalline thermoplastic synthetic resin is selected form one of the group consisting of polyphenylene sulfide, polyamide, and polyethylene terephthalate.

4. The composite as claimed in claim 3, wherein the crystalline thermoplastic synthetic resin is polyphenylene sulfide added with glass fiber as an auxiliary ingredient at a weight percentage of about 25%-35%.

* * * * *